US005454617A

United States Patent [19]
Welter

[11] Patent Number: 5,454,617
[45] Date of Patent: Oct. 3, 1995

[54] MOUNTING DEVICE FO A SWINGABLY MOUNTED SUN VISOR FOR MOTOR VEHICLES

[75] Inventor: Patrick Welter, La Chambre, France

[73] Assignee: Gebr. Happich GmbH, Germany

[21] Appl. No.: 239,254

[22] Filed: May 6, 1994

[30] Foreign Application Priority Data

May 7, 1993 [DE] Germany .............................. 43 152 32.5

[51] Int. Cl.⁶ .......................................................... B60J 3/02
[52] U.S. Cl. ........................................ 296/97.9; 296/97.12
[58] Field of Search ................................. 296/97.1, 97.9, 296/97.12, 97.13; 16/297, 342

[56] References Cited

U.S. PATENT DOCUMENTS

| | | |
|---|---|---|
| 2,304,223 | 9/1941 | Westrope . |
| 2,458,707 | 2/1946 | Jacobs . |
| 4,070,054 | 1/1978 | Cziptschirsch . |
| 4,489,974 | 12/1984 | Warhol . |
| 4,841,599 | 6/1989 | Cebollero ....................... 296/97.12 X |
| 5,139,303 | 8/1992 | Miller ................................... 296/97.9 |
| 5,199,132 | 4/1993 | Gabas ............................... 296/97.9 X |

FOREIGN PATENT DOCUMENTS

| | | |
|---|---|---|
| 0207777 | 1/1987 | European Pat. Off. . |
| 0525143 | 2/1993 | European Pat. Off. . |
| 2470703 | 6/1981 | France . |
| 2495066 | 6/1982 | France . |
| 7623293 | 11/1976 | Germany . |
| 2551633 | 5/1977 | Germany . |
| 3402416 | 7/1985 | Germany . |

Primary Examiner—Dean Kramer
Attorney, Agent, or Firm—Ostrolenk, Faber, Gerb & Soffen

[57] ABSTRACT

A mounting device, particularly for swingably mounted sun visors of motor vehicles. The visor has a shaft with one end section attached to the vehicle and is swingable between first and second end positions around the other end section of the sun visor body which can be inserted into a mounting member of the sun visor body. A detent device is provided with a spring which engages the sun visor body in force locked manner with the shaft in at least one position of the range of swing of the visor body and produces within its range of displacement a moment to be overcome upon a displacement. The mounting member has a mounting hole with at least one radially widened, axially extending groove. The end section of the shaft, which is inserted into the mounting hole, is developed with an axially extending groove with closed ends and outwardly diverging groove walls. A spring, which is adapted in length to the groove, is inserted with initial tension in the groove. The spring consists of a spring steel sheet, and has a U-shaped cross section with arms converging towards the free end and resting against the groove walls.

12 Claims, 1 Drawing Sheet

MOUNTING DEVICE FO A SWINGABLY MOUNTED SUN VISOR FOR MOTOR VEHICLES

BACKGROUND OF THE INVENTION

The present invention relates to a mounting device for a swingably mounted sun visor of a motor vehicle. The visor has a shaft with one end section which can be attached beneath the roof of the vehicle and another end section which is adapted to be inserted in a mounting member of the sun visor body and about which the sun visor body can be swung between first and second end positions. There is a detent device having a spring which resists swinging of the visor body and holds its set positions. The detent device engages the sun visor body with the shaft in a force locked manner in at least one position of the range of swing and produces in its region of displacement a moment which is to be overcome upon a displacement.

Federal Republic of Germany 25 51 633 C2 shows a mounting for a sun visor body including a leaf spring which is bent into a U-shape. The arms of the U clamp the shaft of the mounting device on which the sun visor body is swingably mounted. In order to form a detent device, the shaft is provided with flats against which the arms of the spring rest in a selected detented rotation position. The spring is relatively large and also relatively expensive to manufacture. One particular disadvantage is that this traditional mounting can be removed from the sun visor body only with great difficulty. But, this is still necessary if the sun visor body is to be used again.

SUMMARY OF THE INVENTION

Proceeding from the described mounting device, the object of the present invention is to comparatively simply and inexpensively manufacture the mounting device, but enable it to be removed very easily from the sun visor body in order to be able to recycle the entire sun visor without having to sort different materials.

According to the invention, the mounting device includes a mounting member which has a usually circular mounting hole extending axially through it. The hole has at least one radially widened, axially extending, trough shaped groove or widening at one radial position around the hole. The end section of the shaft inserted into the mounting hole is developed with an axially extending groove along one side of the shaft end section and that groove has closed ends. The shaft end section defines walls of the groove which preferably diverge outward.

A spring adapted to the length of the groove is insertable with initial tension into the groove in the shaft end section. The spring is formed of spring steel sheet and has a U-shaped cross section. Its arms preferably converge toward their free ends so as to rest against the diverging walls of the groove in the shaft end section. This normally urges the spring out of the groove so that its central web can rub the wall of the hole in the mounting member and also can be urged into the trough shaped widening of the hole through the mounting member.

The mounting device of the invention comprises only a few parts which can be produced easily and which furthermore can be easily mounted and, more importantly, can also be removed rapidly and easily. For its removal, the visor support shaft, together with the spring received by it, need merely be pulled out of the mounting member. The sun visor body, which may be comprised entirely of plastic, can then be sent directly for recycling.

In a further development of the invention, the spring positioned in the groove of the shaft end section is of U-shaped cross section and has an axially extending sharper bend in its web joining its arms. The web has a ridge shape which fits into the groove shaped widening or trough of the mounting hole when the visor is rotated into a position where it is desirably detented, like the nonuse position against the vehicle roof. Due to its development and the incline of the walls of the groove, the spring constantly tries to slide out of the groove in the shaft, so it thereby drops softly into the groove shaped widening of the mounting hole. That widening defines a detent position upon a corresponding movement of displacement of the sun visor body. Hard impact noises are avoided.

The web of the spring can be supported by a projection which extends up from the bottom of the groove in the end section of the shaft, when the bend of the web is located outside of the at least one groove shaped widening of the mounting hole, i.e., when the bend of the web is in the round part of the mounting hole. However, the projection also connects the ends of the groove to each other and thus counteracts weakening of the shaft.

The mounting member is preferably comprised of a wear resistant plastic and is developed as a plastic injection molding. Polyacetal resin can advantageously be used as the plastic.

In another embodiment of the invention, the mounting member is advantageously arranged on a reinforcement insert which stiffens the sun visor body. That insert is developed as a plastic injection molding. The manufacture of the mounting member separate from the reinforcement insert has the advantage that a high grade plastic material is necessary only for producing the mounting member, which is of small size, while the reinforcement insert can be made from a cheaper material, preferably polypropylene. Furthermore, the reinforcement insert can be used for different sun visor designs. In that case, only the mounting member need be adapted, for instance in the case of changed detent positions.

The mounting member preferably is seated between two mounting eyes which are formed spaced apart on the reinforcement insert, and the mounting member is plug in connected on the reinforcement insert. The cross section of the openings of the mounting eyes is adapted to the inserted shaft so that the shaft cannot be pulled out of the mounting member when the spring is in the at least one detent position. The mounting member can have a portion of its body developed as a double armed lever to serve as a plug socket for the plug in connection to be produced with the reinforcement insert.

Other objects and features of the invention are described below with reference to one embodiment shown in the drawings.

DETAILED DESCRIPTION OF THE INVENTION

Figure 1:
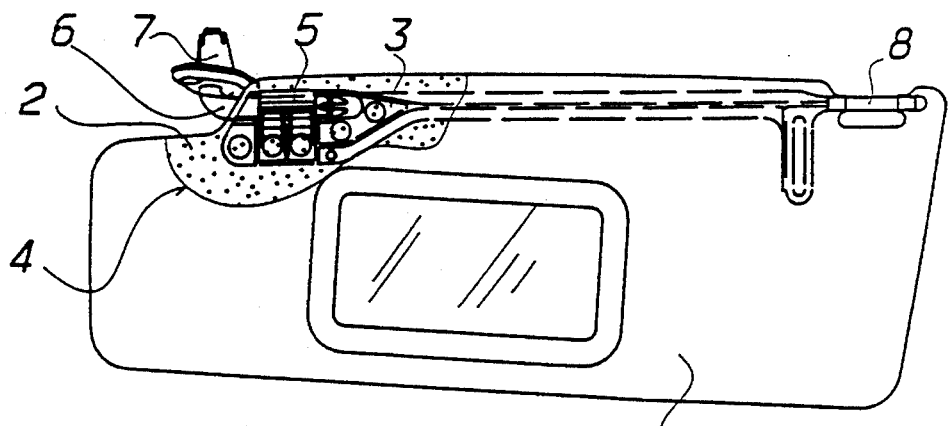
FIG. 1 is a view, broken away in part, of a sun visor body for motor vehicles with mounting device.
Figure 2:
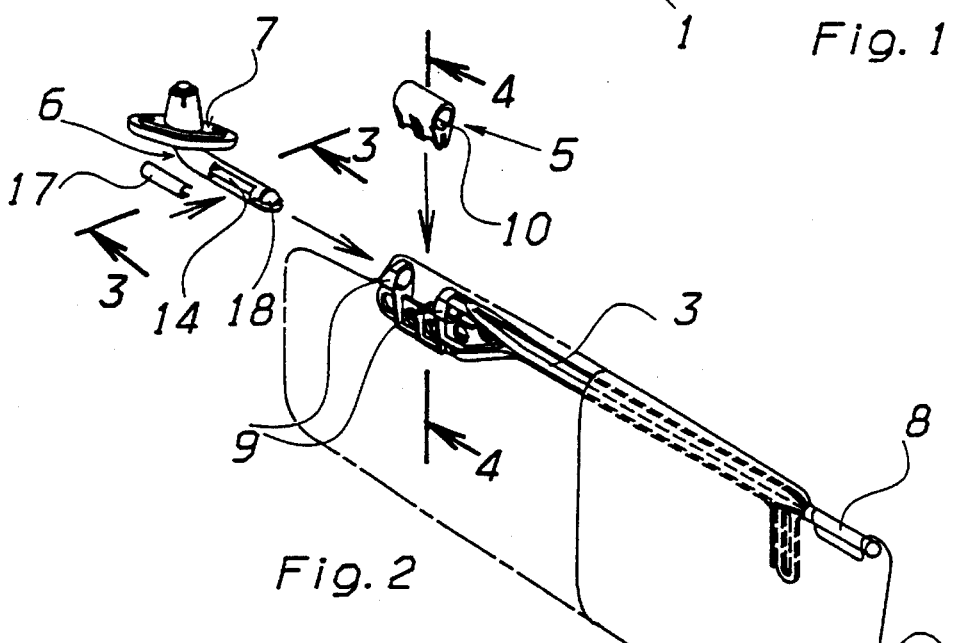
FIG. 2 is an exploded perspective view of the sun visor of FIG. 1.

The sun visor in which the invention is employed includes a sun visor body 1 having a core 2 of a foam material, preferably expanded polypropylene. A reinforcement insert 3 is embedded in the core 2. A cover 4 over the core is preferably a thermoplastic polyolefin foil.

For swingable and flappable attachment of the visor to a car body (not shown), a visor mounting L-shaped shaft 6 is provided in one corner of the sun visor body 1. One end section of the shaft is in a mounting member 5 in the visor body, while the other end section of the shaft is adapted to be fastened to the body of the vehicle with the interposition of a small bracket 7 fastened on the body. An outer support shaft 8 is arranged on the opposite end of the sun visor body 1. It serves for detachable and turnable suspension in an outer support bracket (not shown) on the body of the vehicle. The arm of the L-shaped shaft 6 which is mounted in the sun visor body 1 and the outer support shaft 8 are aligned with each other along an edge of the sun visor body 1. They define the axis for the swinging down of the sun visor against the windshield in order to move it from its position of nonuse in the vicinity of the ceiling or roof into its position of use in the vicinity of the windshield. The sun visor body 1 can also be swung against a side window by removing the outer support shaft from the outer support bracket (not shown) on the vehicle body and swinging it against the side window around the arm of the shaft 6 which is mounted in the small bracket 7.

The reinforcement insert 3, which is developed as an injection molding of low quality plastic, e.g., polypropylene, extends as a rail incorporated in the upper edge of the sun visor body 1. On its mounting side and toward the shaft 6, the insert 3 has two mounting lugs 9 arranged spaced from and facing toward each other. The mounting member 5 is inserted into the resulting space between the mounting lugs 9. The mounting member 5 is made as an injection molding from high grade plastic. As shown in the larger scale of FIGS. 4 and 5, the mounting member 5 has a circular mounting hole 10 extending axially through it which is centered on the centers of the mounting lugs 9 for the shaft end section to pass through at least one of the lugs. The hole 10 has a trough shaped radial widening or groove 11 at one radial side and which extends along the entire length of the mounting member 5. Furthermore, the mounting member 5 is developed with an approximately tear shaped profile. The widening of hole 10 extends into the elongated body part of the mounting member. The body of the member has a region 12 which is developed as a double armed fork which creates a plug type socket 13 for enabling a plug in connection attachment between the mounting member 5 and the reinforcement insert 3 (see FIGS. 4, 5).

On its end section which is inserted into the mounting hole 10 of the mounting member 5, the shaft 6 has an axially extending groove 14 into one side with closed axial ends and outwardly diverging groove walls 15. The axial length of the groove 14 corresponds approximately to the length of the mounting member 5. The groove is circumferentially divided by a projection 16 which protrudes from its bottom, extends over the length of the groove and passes into the ends thereof.

The groove 14 receives a spring 17 which is in the form of an elongated stamped part comprised of spring steel sheet. It has a U-shaped cross section with arms which converge toward their free ends and rest against the diverging walls 15 of the groove. The spring includes a web between its arms which is provided with an axially extending bend. This provides the web with a ridge shape which fits into the groove or trough shaped widening 11 of the mounting hole 10 of the mounting member 5. The spring 17 is increasingly tensioned the deeper it is forced into the groove 14.

Figures 3, 4, 5:
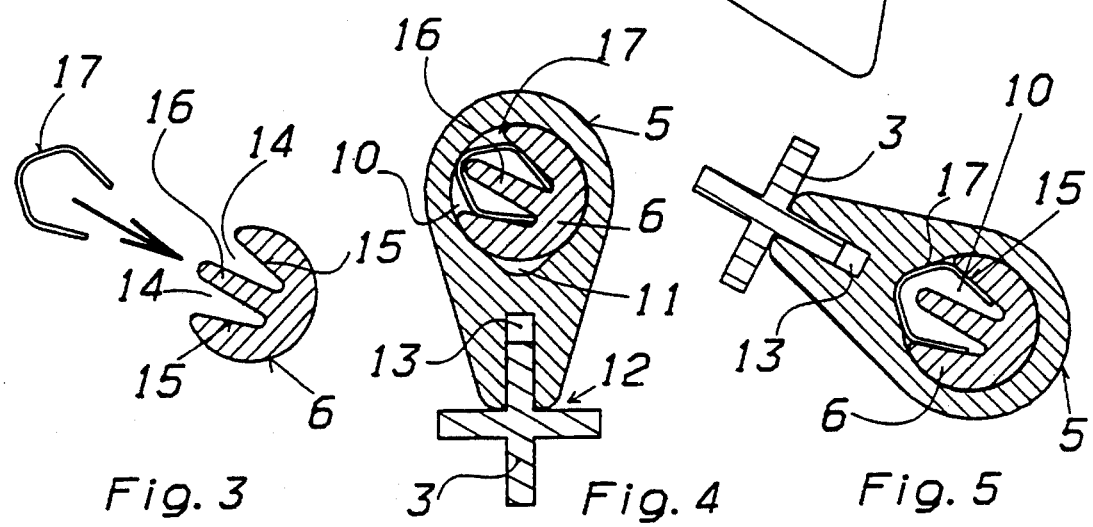
FIG. 3 is a section along the line A—A of FIG. 2.
FIG. 4 is a section along the line B—B of FIG. 2 in a position of use of the sun visor body.
FIG. 5 is a section along the line B—B of FIG. 2 in a position of nonuse or detent position of the sun visor body.

FIG. 4 shows the active position of the spring supported by the projection 16 over the region of swing of the sun visor body 1. The spring 17 produces a frictional force against the wall of the hole 10 which, as has been shown by experiment, is sufficient to hold the sun visor body 1 in every position of swing. FIG. 5 shows the spring in the detent position of the sun visor body 1, which position preferably coincides with the position of nonuse of the sun visor body 1 against the ceiling. In the FIG. 5 position, the spring rests in the trough widening 11.

The end section of the shaft 6 which passes through the mounting lugs 9 of the insert 3 as well as the mounting hole 10 of the mounting member 5 can be provided on its free end with a slit, mushroom-like thickening 18 in order to prevent the shaft from being unintentionally pulled out of the mounting member 5. The mushroom head, however, is intended merely to make removal difficult but not to prevent it.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. A mounting device for a swingably mounted sun visor for a motor vehicle, the sun visor including a sun visor body, a shaft having a first and end section that is attachable to the vehicle and having a second end section insertable into the sun visor body;

a mounting member in the sun visor body for receiving the second end section of the shaft and for moving along with the sun visor body;

the mounting member having a wall defining a hole through the mounting member for receiving the second end section of the shaft, the hole having an axially extending and radially widened groove therein, the second end section being shaped to rotate in the mounting hole;

an axially extending groove having side walls and being defined in the side of the shaft second end section;

a spring of U-shaped cross section including legs joined by a web, the spring being shaped and biased so that the web thereof is pressed out against the wall defining the mounting hole, the spring being installed in the groove in the second end section, the legs of the spring engaging the side walls of the groove, the spring further being under initial tension and projecting outward from the groove to engage the wall of the mounting hole, and the spring engaging the wall of the groove holding the mounting member and the visor body at selected rotation positions and also detenting that position of the mounting member when the second end section of the shaft is rotated in the mounting member so that the spring is in the radially widened groove of the mounting hole.

2. The mounting device for a sun visor of claim 1, wherein the groove in the second end section of the shaft has outwardly diverging groove walls and the arms of the U-shaped spring converge toward the free ends thereof, which ends extend into the groove in the second end section, and the arms of the spring rest against the walls of the groove.

3. The mounting device for a sun visor of claim 1, wherein the radially widened groove in the mounting member is positioned so that with the spring in the groove, the mounting member and visor body are in the nonuse position of the visor body.

4. The mounting device for a sun visor of claim 1, wherein the web of the U-shaped spring includes an axially extending bend for providing the web with a ridge shape that fits into the groove of the mounting hole.

5. The mounting device for a sun visor of claim 1, further comprising a projection extending out of the groove in the second end section of the shaft, the projection being of a length to contact and support the web of the spring against the wall of the mounting hole when the mounting member is rotated so that the spring is contacting the wall of the mounting hole outside the radially widened groove.

6. The mounting device for a sun visor of claim 1, wherein the mounting member is comprised of wear resistant plastic material.

7. The mounting device for a sun visor of claim 1, further comprising a reinforcement insert in the visor body for stiffening the visor body, the mounting member being arranged on the reinforcement insert.

8. The mounting device for a sun visor of claim 7, further comprising spaced apart mounting lugs developed on the reinforcement insert at the mounting member and the mounting member being seated between the mounting lugs on the insert; and THE shaft second end section extending through at least one mounting lug and the mounting member.

9. The mounting device for a sun visor of claim 8, further comprising means On the mounting member for receiving the reinforcement insert.

10. The mounting device for a sun visor of claim 7, further comprising means on the mounting member for receiving the reinforcement insert.

11. The mounting device for a sun visor body of claim 10, wherein the means on the mounting member for receiving the reinforcement insert comprises a region developed as a double armed fork defining a plug type socket, and the reinforcement insert being shaped to form a plug in connection to the socket of the mounting member.

12. The mounting device for a sun visor body of claim 7, wherein the mounting member includes means thereon for receiving the reinforcement insert plugged into the mounting member.

* * * * *

UNITED STATES PATENT AND TRADEMARK OFFICE
CERTIFICATE OF CORRECTION

PATENT NO. : 5,454,617
DATED : October 3, 1995
INVENTOR(S) : Patrick Welter

It is certified that error appears in the above-indentified patent and that said Letters Patent is hereby corrected as shown below:

On the title page, item [54], and column 1, line 1, change "FO" to —FOR—.

Signed and Sealed this

Twentieth Day of February, 1996

Attest:

Attesting Officer

BRUCE LEHMAN

Commissioner of Patents and Trademarks